Jan. 23, 1968   S. ÅKE G. SVENSSON   3,364,946
PULSATOR FOR PNEUMATIC PIPELINES
Filed Dec. 9, 1964
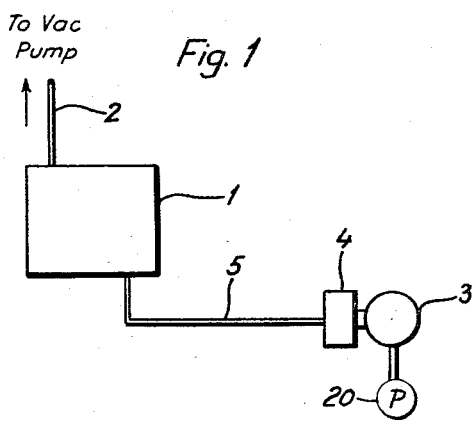
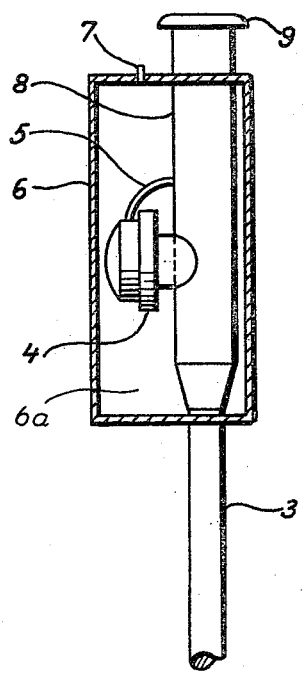
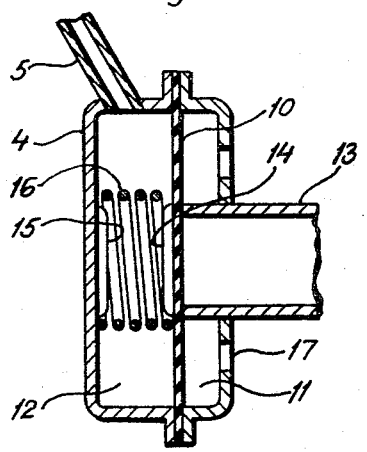
INVENTOR.
Stig Åke Gösta Svensson
BY
Davis, Hoxie, Faithfull & Hapgood
ATTORNEYS United States Patent Office 3,364,946
Patented Jan. 23, 1968

3,364,946
PULSATOR FOR PNEUMATIC PIPELINES
Stig Åke Gösta Svensson, Sodertalje, Sweden, assignor to Alfa-Laval AB, Stockholm, Sweden, a corporation of Sweden
Filed Dec. 9, 1964, Ser. No. 417,103
Claims priority, application Sweden, Dec. 18, 1963, 14,126/63
2 Claims. (Cl. 137—624.13)

ABSTRACT OF THE DISCLOSURE

A valve housing has a chamber which permanently communicates with atmosphere through an opening and is adapted to communicate with a vacuum pipeline through an opening in a valve seat in the chamber. Means are provided for intermittently displacing a valve body from this seat at a constant frequency, so that air is admitted to the vacuum pipeline at regular intervals. Preferably, the valve body is a movable wall separating said chamber from a second chamber in the housing, and this wall is displaced intermittently from the seat by a pneumatic pulsator communicating with the second chamber.

---

The present invention relates to pulsating systems for intermittently supplying air or other gas, at a constant frequency, to a pipeline or the like.

It is known to provide a valve operating as a pulsator to effect an intermittent supply of air to a pipeline to be cleaned by liquid flushing. The pulsation frequency of such a valve varies according to the actual liquid-free volume of the interior of the pipeline into which the air is admitted. Furthermore, the pipelines to be cleaned, such as milk pipelines of machine milking installations in different dairies, have different internal volumes, so that the pulsation frequency will be different in different dairies. In view of the fact that an optimum of clean-flushing effect is attained at a certain pulsation frequency, it is desired to be able to keep this frequency constant.

The principal object of the present invention is to provide a pulsating system which solves this problem.

According to the invention, a valve connected to the pipeline has two spaces separated from each other by means of a movable wall, such as a piston or diaphragm. One of these spaces is in permanently open communication with the outer atmosphere and has a valve seat which, in cooperating with the movable wall, opens and closes a connection between this space and the pipeline. The other of these spaces is connected to a conventional pulsator of the type which operates at a constant frequency, this pulsator subjecting the movable wall to pulsating pressure changes.

As long as the valve is open, atmospheric air rushes into the pipeline. This air must be removed from the pipeline by means of a vacuum pump. The larger the air quantity entering the pipeline at each opening of the valve, the more the vacuum pump is loaded. In order to attain the desired effects provided by the air shocks, it is not necessary to supply atmospheric air to the pipeline throughout the entire period during which the valve is open. Consequently, according to an additional feature of the present invention, a large chamber is included in the permanently open connection between the one space in the valve and the outer atmosphere, which chamber in its turn communicates with the outer atmosphere through a throttle opening. The throttle opening is made so small that the air content of the chamber is essentially emptied during only a small part of the time during which the valve is open. During the time the valve is kept closed, the chamber is again filled with atmospheric air. In this way, the load on the vacuum pump is reduced. To provide a compact design, the valve may be located in the interior of the chamber.

The invention is described more in detail below with reference to the accompanying drawing, in which FIG. 1 is a schematic view of an embodiment of the present pulsating system; FIG. 2 is a sectional view showing the valve appurtenant to the pulsator inserted in a chamber; and FIG. 3 is a sectional view of the valve.

In FIG. 1, a vacuum-driven pulsator of conventional design and operating under constant conditions is designated by reference numeral 1. Due to these conditions, the pulsation frequency is kept constant. The pulsator 1 is assumed to be connected by means of a pipeline 2 to the vacuum pump (not shown) of a pipeline milking plant and to have for its object to control, during the complete course of washing of the milk pipeline of the plant, intermittent admissions of air into the latter in such a way that the admissions are affected at a constant frequency. The milk pipeline or a connection thereto is designated at 3. A valve 4 is provided in the milk pipeline, and its opening and closing movements are controlled by the pulsator 1, the latter being connected through a pipeline 5 to the valve 4. The pipeline 3 is permanently under vacuum, and when the valve 4 opens, atmospheric air is admitted into the pipeline 3. In this way, air shocks occur in the pipeline 3 with a constant frequency and ensure an effective washing and flushing of the complete inside of the milk pipeline due to the liquid plugs which the air shocks generate.

In order not to overload the pump 20 (vacuum source) keeping the milk pipeline 3 under vacuum, a chamber is arranged in the connection between the one space of the valve 4 and the outer atmosphere, which chamber restricts the quantity of air which at each opening of the valve flows into the pipeline 3. This arrangement is shown in FIG. 2, where a housing 6 forms the aforementioned chamber indicated at 6a and which contains the valve 4. The chamber is provided with a small throttle opening 7, through which the chamber is in permanently open connection to the outer atmosphere. When the valve 4 opens, air is quickly evacuated from the chamber 6a due to the high vacuum in the pipeline 3. Subsequently, atmospheric air flows relatively slowly into the chamber 6a through the opening 7; but during the time when the valve 4 is kept closed, the chamber 6a is again filled with atmospheric air. In the embodiment shown in FIG. 2, the pipeline 3 forms a connection to the milk pipeline and consists of a vertical pipe, the upper part 8 of which is wider than the other parts of the pipeline and forms a storage space for plugs (which may be made of foam plastic) for use in the cleaning of the milk pipeline. The pipe part 8 is shown as fitter in the chamber 6a and supports the valve 4. At its upper end, the pipe part 8 protrudes through the top of housing 6, this protruding part having an air-tight cover 9 which may be removed to permit filling the pipe part 8 with a supply of such plugs.

Referring to FIG. 3, the vacuum and air pressure impulses from the pulsator 1 reach the valve 4 through the pipeline 5. The valve housing consists of two halves which are separated by a rubber diaphragm 10 and form therewith two spaces 11 and 12. A nipple 13, which connects the valve to the pipeline 3 and admits air into the latter, serves as a valve seat. The diaphragm 10 has a projection 14, and the inside of the valve housing has an opposing projection 15. These projections serve to guide a coil spring 16 which biases the diaphragm 10 toward its closing position against the open end of nipple 13. Apertures 17 in the valve housing wall connect the space 11 to the outer atmosphere.

In the operation of valve 4, when its space 12 is put under vacuum by the pulsator 1 (via pipe 5), the air pressure in the space 11 displaces the diaphragm 10 to the left against the action of the spring 16. The air of atmospheric pressure, which is present in the chamber 6a, flows rapidly through the apertures 17 and the space 11 into the nipple 13 and thus into the milk pipeline 3, thereby creating an air shock in the latter. When air of atmospheric pressure is supplied from the pulsator 1 (via pipe 5) to the space 12, the diaphragm 10 is displaced to the right against the nipple opening, thus closing the latter. The valve-closing displacement of the diaphragm to the right takes place under the action of the spring 16, due to the fact that vacuum is prevailing in the chamber 6a and thus in the space 11 at the closing moment.

The following claims refer to air as the medium to be supplied intermittently to the pipeline, but it will be understood that this medium may be any other gas.

I claim:

1. The combination of a vacuum pipeline, a vacuum source permanently communicating with said pipeline for maintaining the same under vacuum while being supplied intermittently with air, a valve including a housing and a movable wall dividing the interior of the housing into first and second spaces, said first space having a permanently open communication with atmosphere, means forming a flow connection from said first space to the pipeline and including a valve seat in the first space, said wall being movable relative to the seat, and a pneumatic pulsator communicating with said second space and operable at constant frequency to reciprocate the wall between a first position for closing said flow connection and a second position for venting the pipeline to atmosphere by way of said first space and said permanently open communication.

2. The combination of a vacuum pipeline, a vacuum source permanently communicating with said pipeline for maintaining the same under vacuum while being supplied intermittently with air, a valve having a seat opening into the pipeline and also having a valve body movable relative to the seat to open and close the seat opening, means forming a chamber adapted to communicate with the pipeline through said valve and communicating permanently with atmosphere by way of a throttle opening, and means associated with the valve body for reciprocating the same at constant frequency between a first position for closing said seat opening and a second position for venting the pipeline to atmosphere by way of said chamber and throttle opening, said valve also including a housing containing said valve body and seat and located in said chamber.

References Cited

UNITED STATES PATENTS

| 3,255,732 | 6/1966 | Raht | 119—14.36 X |
| 2,516,328 | 7/1950 | Lowry | 137—103 X |
| 2,682,880 | 7/1954 | Ozmina | 137—103 X |
| 3,307,585 | 3/1967 | Schilling et al. | 137—625.67 X |

FOREIGN PATENTS

| 894,474 | 4/1962 | Great Britain. |
| 600,738 | 7/1934 | Germany. |

M. CARY NELSON, *Primary Examiner.*

A. ROSENTHAL, W. JOHNSON, *Assistant Examiners.*